(12) United States Patent
Kin

(10) Patent No.: US 11,591,828 B2
(45) Date of Patent: Feb. 28, 2023

(54) HANDLE DEVICE

(71) Applicant: ALPHA CORPORATION, Kanagawa (JP)

(72) Inventor: Lan Kin, Yokohama (JP)

(73) Assignee: ALPHA CORPORATION, Kanagawa (JP)

(*) Notice: Subject to any disclaimer, the term of this patent is extended or adjusted under 35 U.S.C. 154(b) by 610 days.

(21) Appl. No.: 16/432,155

(22) Filed: Jun. 5, 2019

(65) Prior Publication Data

US 2019/0284846 A1 Sep. 19, 2019

Related U.S. Application Data

(63) Continuation of application No. PCT/JP2017/044202, filed on Dec. 8, 2017.

(30) Foreign Application Priority Data

Dec. 8, 2016 (JP) .............................. JP2016-238197

(51) Int. Cl.
*E05B 79/06* (2014.01)
*E05B 85/12* (2014.01)
(Continued)

(52) U.S. Cl.
CPC .............. *E05B 79/06* (2013.01); *E05B 85/12* (2013.01); *B60J 5/04* (2013.01); *B60J 5/10* (2013.01)

(58) Field of Classification Search
CPC ............ E05B 79/06; E05B 85/12; B60J 5/04; B60J 5/10
(Continued)

(56) References Cited

U.S. PATENT DOCUMENTS

| 8,485,573 B2 * | 7/2013 | Gouhara ................. E05B 85/18 |
| | | 292/336.3 |
| 9,803,402 B2 * | 10/2017 | Ichikawa ................ E05B 79/06 |
| 2011/0175377 A1 | 7/2011 | Tanaka et al. |

FOREIGN PATENT DOCUMENTS

| CN | 102159780 A | 8/2011 |
| DE | 10211614 A1 | 10/2003 |
(Continued)

OTHER PUBLICATIONS https://www.driv-lok.com/product/knurled-pins-studs/ (Year: 2018).*
(Continued)

*Primary Examiner* — Kristina R Fulton
*Assistant Examiner* — Thomas L Neubauer
(74) *Attorney, Agent, or Firm* — Studebaker & Brackett PC

(57) ABSTRACT

A handle device includes a handle case disposed on a member on a vehicle body side, a cylindrical in supported by the handle case, and an operation member housed in the handle case and pivotally supported by the pin so as to be rotatable. The handle case includes a pin insertion hole into which the pin is configured to be inserted from an outer side of the handle case, and a rib which is provided to face a head portion of the pin inserted into the pin insertion hole and prevents the pin from slipping off. The rib extends from the handle case along as in-plane direction of a case region around the pin insertion hole, and includes an elastic piece elastically deformed in a direction orthogonal to an insertion direction of the pin.

8 Claims, 7 Drawing Sheets

(51) Int. Cl.
*B60J 5/04* (2006.01)
*B60J 5/10* (2006.01)

(58) Field of Classification Search
USPC ............. 292/336.3, 1, 80, DIG. 27, DIG. 53, 292/DIG. 54
See application file for complete search history.

(56) References Cited

FOREIGN PATENT DOCUMENTS

| | | |
|---|---|---|
| JP | S61160314 U | 10/1986 |
| JP | H07-259393 A | 10/1995 |
| JP | H08021423 A | 1/1996 |
| JP | H08-067147 A | 3/1996 |
| JP | H09-078897 A | 3/1997 |
| JP | 2006-316554 A | 11/2006 |
| JP | 2014-034801 A | 2/2014 |

OTHER PUBLICATIONS

International Search Report issued in PCT/JP2017/044202; dated Feb. 20, 2018.
Written Opinion issued in PCT/JP2017/044202; dated Feb. 20, 2018.
The extended European search report issued by the European Patent Office dated Jun. 26, 2020, which corresponds to European Patent Application No. 17877881.7.
An Office Action mailed by China National Intellectual Property Administration dated Jul. 3, 2020, which corresponds to Chinese Patent Application No. 201780075011.8 and is related to U.S. Appl. No. 16/432,155 with English language translation.

\* cited by examiner

HANDLE DEVICE

CROSS REFERENCE TO RELATED APPLICATIONS

This application is a continuation of PCT application No. PCT/JP2017/044202, which was filed on Dec. 8, 2017 based on Japanese Patent Application No. 2016-238197 filed on Dec. 8, 2016, the contents of which are incorporated herein by reference.

TECHNICAL FIELD

The present disclosure relates to a handle device.

BACKGROUND ART

In a related art, a handle device for opening a side door and a back door of a vehicle is known, and among handle devices of this type, there is an inside door handle device that performs an opening operation of a door from a vehicle cabin interior side. The inside door handle device is disposed is a door trim mounted on the vehicle cabin interior side of a door inner panel.

For example, Patent Literature 1 discloses a handle device for performing an opening operation of an automobile door. The handle device includes a handle case (body main body) having a substantially U-shaped cross-section, a pin (shaft) supported by both side walls of the handle case, a handle which is an operation member rotatably and pivotally supported by the pin and performing the opening operation of the door, and a lock knob which is rotatably and pivotally supported by the pin and is for locking and unlocking a door lock device. The pin supported by the both side walls of the handle case is provided with a knurl on an outer peripheral surface of one end thereof. The pin is prevented from easily falling off by fitting the knurl formed on the pin into the side wall of the handle case.

CITATION LIST

Patent Literature

[Patent Literature 1] JP-A-H07-259393

SUMMARY OF INVENTION

In the handle device, since vibration is applied as the vehicle travels, the pin may fall off only with a fitting structure. Therefore, it is conceivable to dispose slip-off prevention means on an outer side of the handle case so as to reach the top of the pin. However, there is only a small space between the handle case and a member (for example, a door trim)) on a vehicle body side to which the handle case is assembled, and there are problems that the slip-off prevention means and the member on the vehicle body side interfere with each other, and the handle device cannot be easily assembled.

The present disclosure relates to a handle device excellent in assemblability while including a slip-off prevention structure of a pin which pivotally supports an operation member.

According to an embodiment, a handle device includes a handle case disposed on a member on a vehicle body side, a cylindrical pin supported by the handle case, and an operation member housed in the handle case and pivotally supported by the pin so as to be rotatable. Here, the handle case includes a pin insertion hole into which the pin can be inserted from an outer side of the handle case, and a rib which is provided to face a head portion of the pin inserted into the pin insertion hole and prevents the pin from slipping off. In this case, the rib extends from the handle case along an in-plane direction of a case region around the pin insertion hole, and is formed of an elastic piece elastically deformed in a direction orthogonal to an insertion direction of the pin.

According to the embodiment, in the handle device, it is preferable that the elastic piece is elastically deformed in the direction orthogonal to the insertion direction of the pin to allow the pin to be inserted into the pin insertion hole. It is preferable that the head portion of the pin passes through the elastic pieces and the elastic pieces elastically return, and thereby the elastic pieces are positioned above the head portion of the pin to restrict the pin from falling off.

According to the embodiment, in the handle device, the elastic piece is formed of a plate-shaped body having a plate width set in the insertion direction of the pin, and a surface of the tip end portion of the elastic piece facing the pin is preferably set in a tapered shape such that a plate thickness increases along the insertion direction of the pin.

According to the embodiment, in the handle device, it is preferable that the handle case includes a vertical wall portion which faces a vehicle body panel, and a peripheral wall portion which is connected to a peripheral edge of the vertical wall portion and surrounded by an interior trim mounted on a vehicle cabin interior side of the vehicle body panel, the pin insertion hole is provided in the peripheral wall portion of the handle case, and a base end portion of the elastic piece is connected to the peripheral wall portion.

According to the embodiment, in the handle device, the ribs are preferably provided symmetrically on both sides of the pin.

Advantageous Effects of Invention

According to the embodiment, in the handle device, since the structure in which the elastic pieces forming the ribs is unlikely to protrude to the outside of the handle case is adopted, it is possible to provide the handle device excellent in assemblability while preventing the pin which pivotally supports the operation member from slipping off.

DESCRIPTION OF EMBODIMENTS

Figure 1:
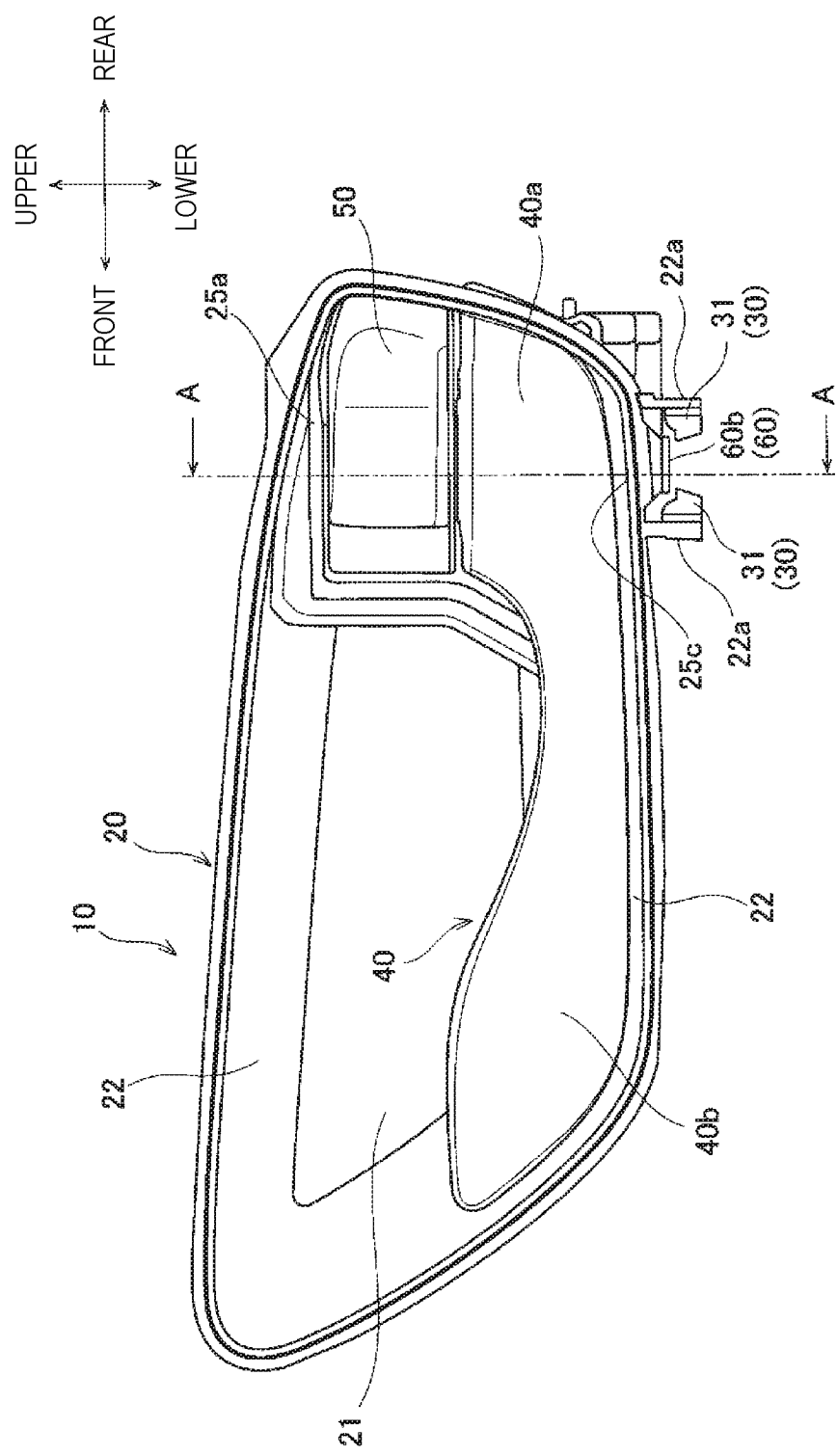
FIG. 1 is a front view schematically showing an inside door handle device.
Figure 2:
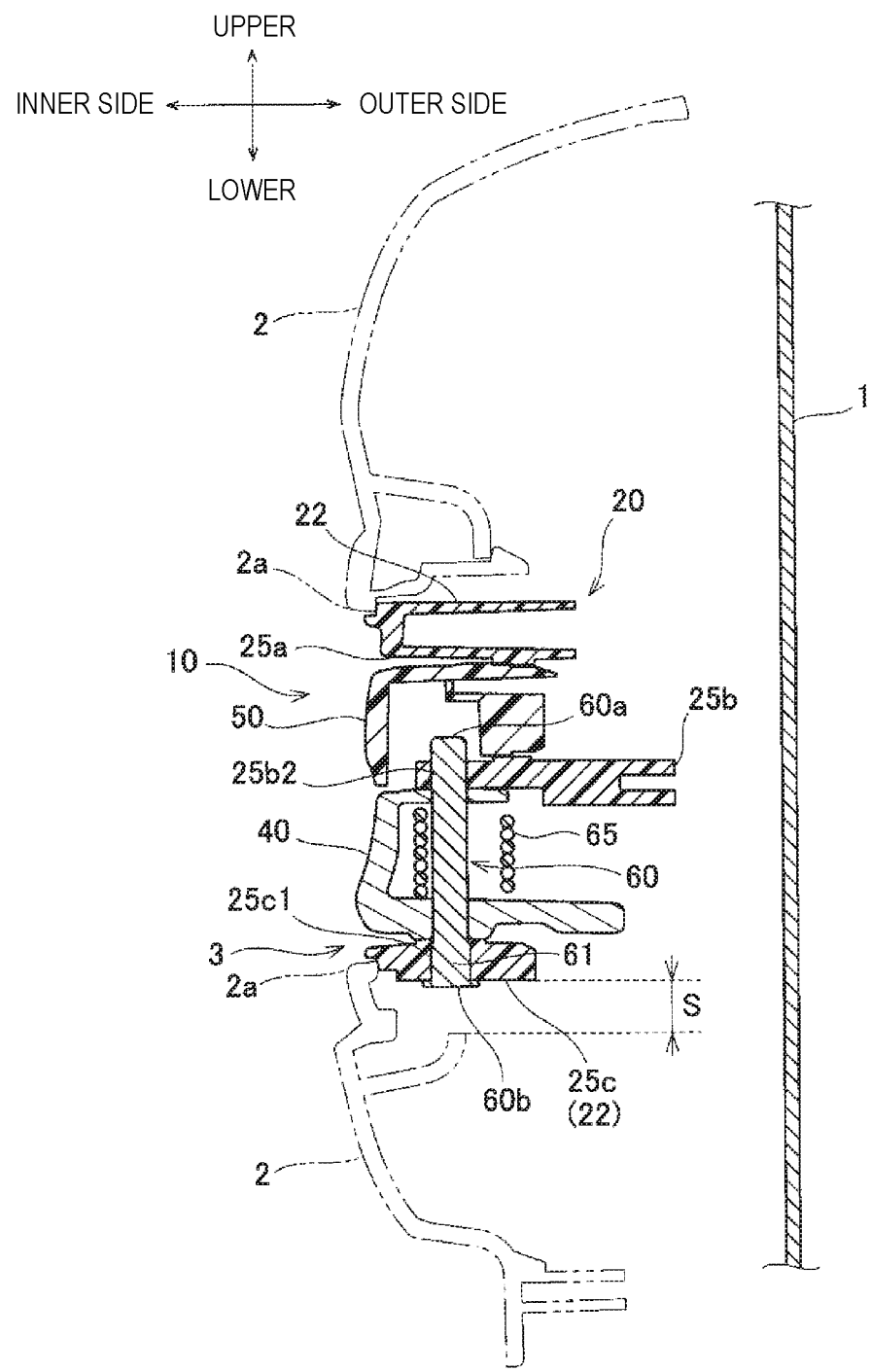
FIG. 2 is a cross-sectional view of the inside door handle device shown in FIG. 1 taken along a line A-A.
Figure 3:
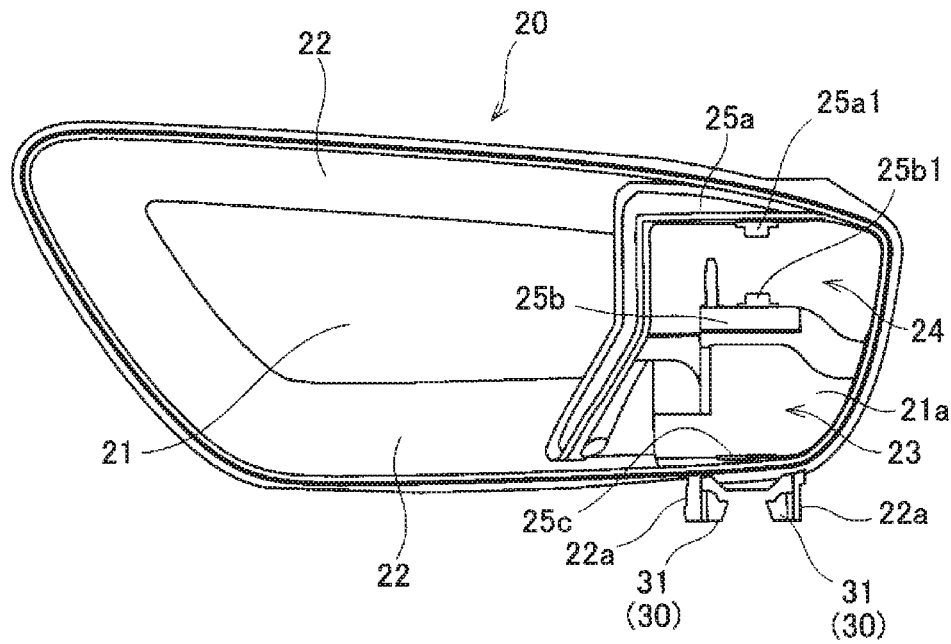
FIG. 3 is a front view schematically showing a handle case.

Hereinafter, an inside door handle device 10 according to the present embodiment will be described. Here, FIG. 1 is a front view schematically showing the inside door handle device 10 according to the present embodiment. FIG. 2 is a cross-sectional view of the inside door handle device shown in FIG. 1 taken along a line A-A. FIG. 3 is a front view schematically showing a handle case 20.

The inside door handle device 10 is a handle device for performing an opening operation of a door of a vehicle from a vehicle cabin interior side. The inside door handle device 10 is disposed in a door trim 2 that covers the vehicle cabin interior side of a door inner panel 1 configuring the door of the vehicle, and faces the vehicle cabin interior side so as to be formed integrally with the door trim 2.

The inside door handle device 10 mainly includes the handle case 20, a handle 40, a lock knob 50, and a pin 60.

The handle case 20 holds the handle 40 and the lock knob 50 and defines a required space for gripping the handle 40. The handle case 20 is disposed in an opening portion 3 of the door trim 2 that covers the door inner panel 1, and is fixed to a required position of the door inner panel 1.

The handle case 20 includes a vertical wall portion 21 facing the door inner panel 1, and a peripheral wall portion 22 connected to a peripheral edge of the vertical wall portion 21, and a cross-section thereof along an upper-lower direction is formed in a substantially U-shape. The vertical wall portion 21 is formed in a substantially flat plate shape, and a handle holding portion 23 holding the handle 40 and a lock knob holding portion 24 holding the lock knob 50 are formed on a vehicle rear side.

The handle holding portion 23 is set at a lower position in the handle case 20, and the lock knob holding portion 24 is set above the handle holding portion 23 in the handle case 20. An upper part of the lock knob holding portion 24 is partitioned by an upper wall portion 25a forming a part of the peripheral wall portion 22 of the handle case 20, and the handle holding portion 23 and the lock knob holding portion 24 are separated by a partition wall portion 25b. An lower part of the handle holding portion 23 is partitioned by a lower wall portion 25c forming a part of the peripheral wall portion 22 of the handle case 20. The handle 40 and the lock knob 50 disposed in the handle case 20 are arranged side by side in an upper-lower direction.

The peripheral wall portion 22 extends toward the vehicle cabin interior side by using a connecting portion with the vertical wall portion 21 as a basic point. The shape of a tip end side of the peripheral wall portion 22 corresponds to an opening shape of the opening portion 3, and in a state in which the handle case 20 is disposed in the door trim 2, the tip end side of the peripheral wall portion 22 extends along an opening peripheral edge portion 2a of the door trim 2. The periphery of the peripheral wall portion 22 is surrounded by the door trim 2 (opening peripheral edge portion 2a), and thereby the handle case 20 and the door trim 2 are designed to have an integral property.

The handle 40 is an operation member that a user grips and operates and is disposed at a lower position in the handle case 20. The handle 40 includes a base end portion 40a housed in the handle holding portion 23, and an operation portion 40b extending further forward of the vehicle than the base end portion 40a and gripped and operated by the user. The pin 60 is disposed along the upper-lower direction in the handle holding portion 23. The pin 60 penetrates the base end portion 40a, and the base end portion 40a is pivotally supported by the pin 60. The handle 40 (operation portion 40b) is configured to be rotatable about the pin 60, and rotates between a closed position housed in the handle case 20 and an open position drawn from the handle case 20.

The base end portion 40a of the handle 40 is connected to a door lock device (not shown) provided on a door side via a connecting member (not shown) such as a wire, and an operating force of the handle 40 is transmitted to the door lock device. When the operation portion 40b of the handle 40 is in the closed position, the base end portion 40a of the handle 40 is housed in the handle holding portion 23. In this case, the door lock device is in a locked state, and the door is maintained in a closed state. On the other hand, when the operation portion 40b of the handle 40 is rotated from the closed position to the open position, a tip end side of the base end portion 40a protrudes outward from an opening 21a of the vertical wall portion 21. Accordingly, the door lock device is operated through the connecting member, and the locked state of the door lock device is released. As a result, the door can be opened.

The lock knob 50 is an operation member that is operated by the user in order to restrict the opening of the door. The lock knob 50 is disposed at an upper position in the handle case 20 and is housed in the lock knob holding portion 24. The upper wall portion 25a is provided with a convex portion 25a1 protruding downward, and the partition wall portion 25b is provided with a convex portion 25b1 protruding upward at a position facing the convex portion 25a1. In a state in which the lock knob 50 is housed in the lock knob holding portion 24, the pair of convex portions 25a1, 25b1 are inserted into concave recessed portions (not shown) respectively set on an upper side and a lower side of the lock knob 50. Accordingly, the lock knob 50 is pivotally supported by the pair of convex portions 25a1, 25b1, and is configured to be rotatable around the, pair of convex portions 25a1, 25b1.

The lock knob 50 is connected to the door lock device described above. By rotating the lock knob 50, a door opening operation on the door lock device by the handle 40 is canceled. Accordingly, the opening of the door can be restricted.

The pin 60 is a member which pivotally supports the handle 40 and configured by, for example, a cylindrical shaft body. The pin 60 is inserted inward from an outer side of the handle case 20 through a pin insertion hole 25c1 described later, and both ends of the pin 60 are supported by the handle case 20. The pin 60 penetrates the base end portion 40a of the handle 40 while being supported by the handle case 20.

The partition wall portion 25b is provided with a through hole 25b2 penetrating the partition wall portion 25b in the upper-lower direction. On the other hand, the lower wall portion 25c is provided with the pin insertion hole 25c1 penetrating the lower wall portion 25c in the upper-lower direction at a position facing the through hole 25b2. A tip end portion 60a side, which is one end of the pin 60, is inserted into the through hole 25b2 of the partition wall portion 25b and supported by the partition wall portion 25b. Another end side of the pin 60 is inserted into the pin insertion hole 25c1 of the lower wall portion 25c and supported by the lower wall portion 25c.

Another end of the pin 60 is provided with a flange shaped head portion 60b enlarged radially outward, and the pin 60 is prevented from being buried in the handle case 20 when being inserted into the handle case 20. Further, a knurled portion 61 in which an outer peripheral surface of the shaft body is knurled is set in a predetermined range adjacent to the head portion 60b on the other end side of the pin 60. An outer diameter of the knurled portion 61 is set to be larger than an inner diameter of the pin insertion hole 25c1 of the lower wall portion 25c, and the knurled portion 61 is press-fitted into the pin insertion hole 25c1. Accordingly, the knurled portion 61 is tightly fitted into the pin insertion hole 25c1, and the pin 60 is prevented from falling off.

The pin 60 is provided with a torsion spring 65. One end of the torsion spring 65 is connected to a base end portion 40a of the handle 40, and another end is connected to the handle case 20. By the torsion spring 65, a biasing force which biases the handle 40 (operation portion 40b) to the closed position is constantly applied to the handle 40. Therefore, the handle 40 is normally maintained in the closed position.

Figure 4:
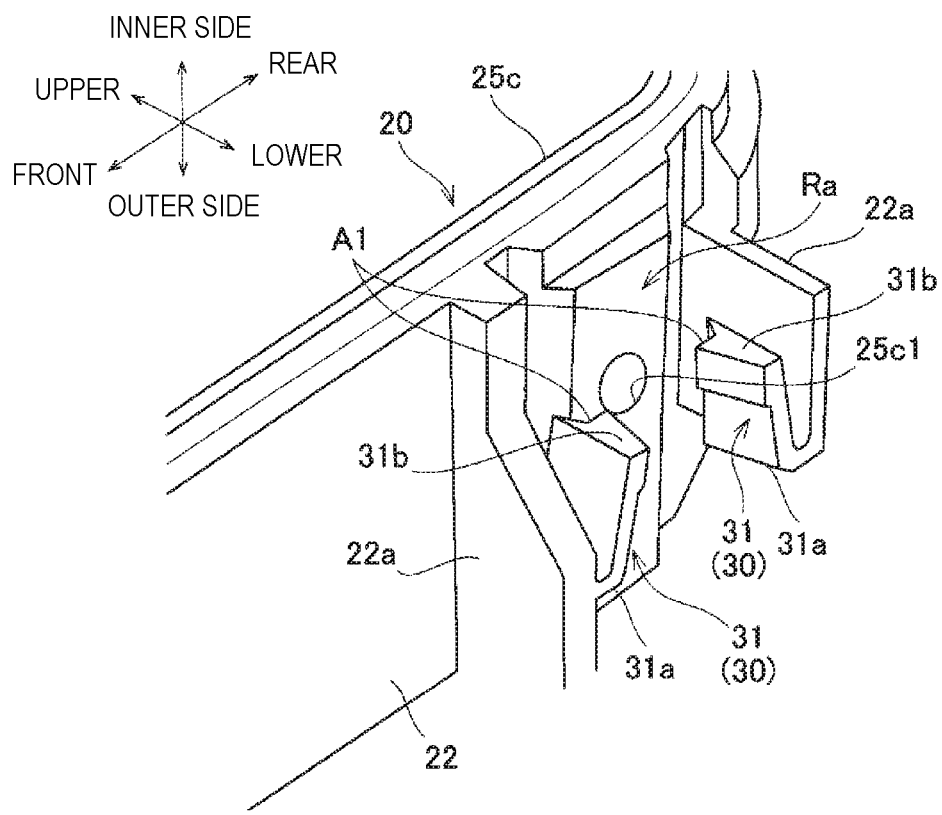
FIG. 4 is a perspective view of the handle case centered on a slip off prevention structure of a pin.
Figure 5:
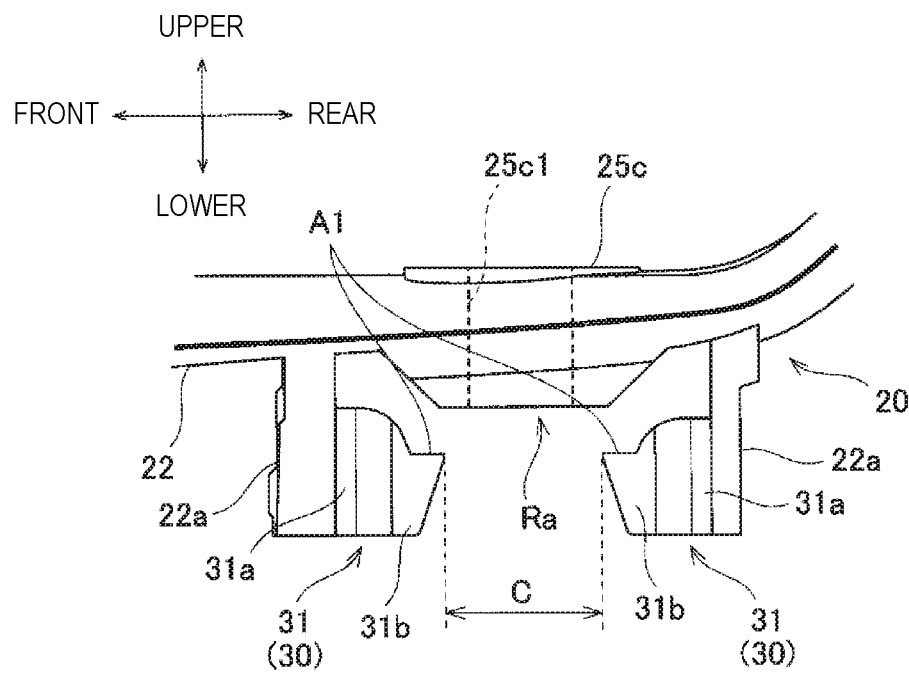
FIG. 5 is a front view of the handle case centered on the slip-off prevention structure of the pin.
Figure 6:
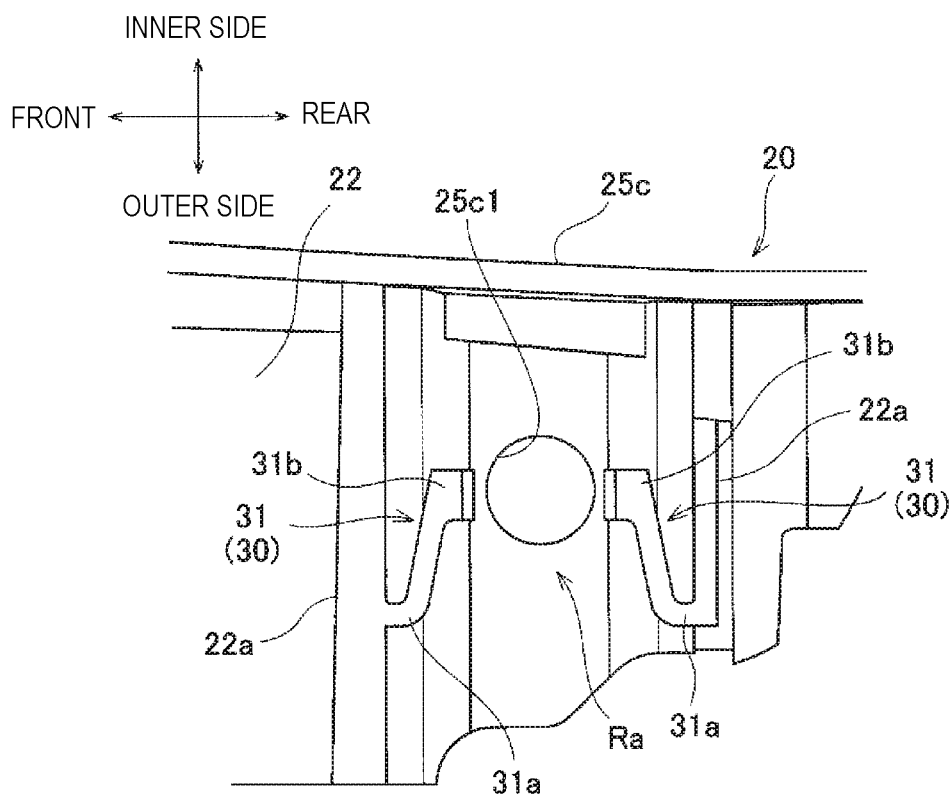
FIG. 6 is a bottom view of the handle case centered on the slip-off prevention structure of the pin.
Figure 7:
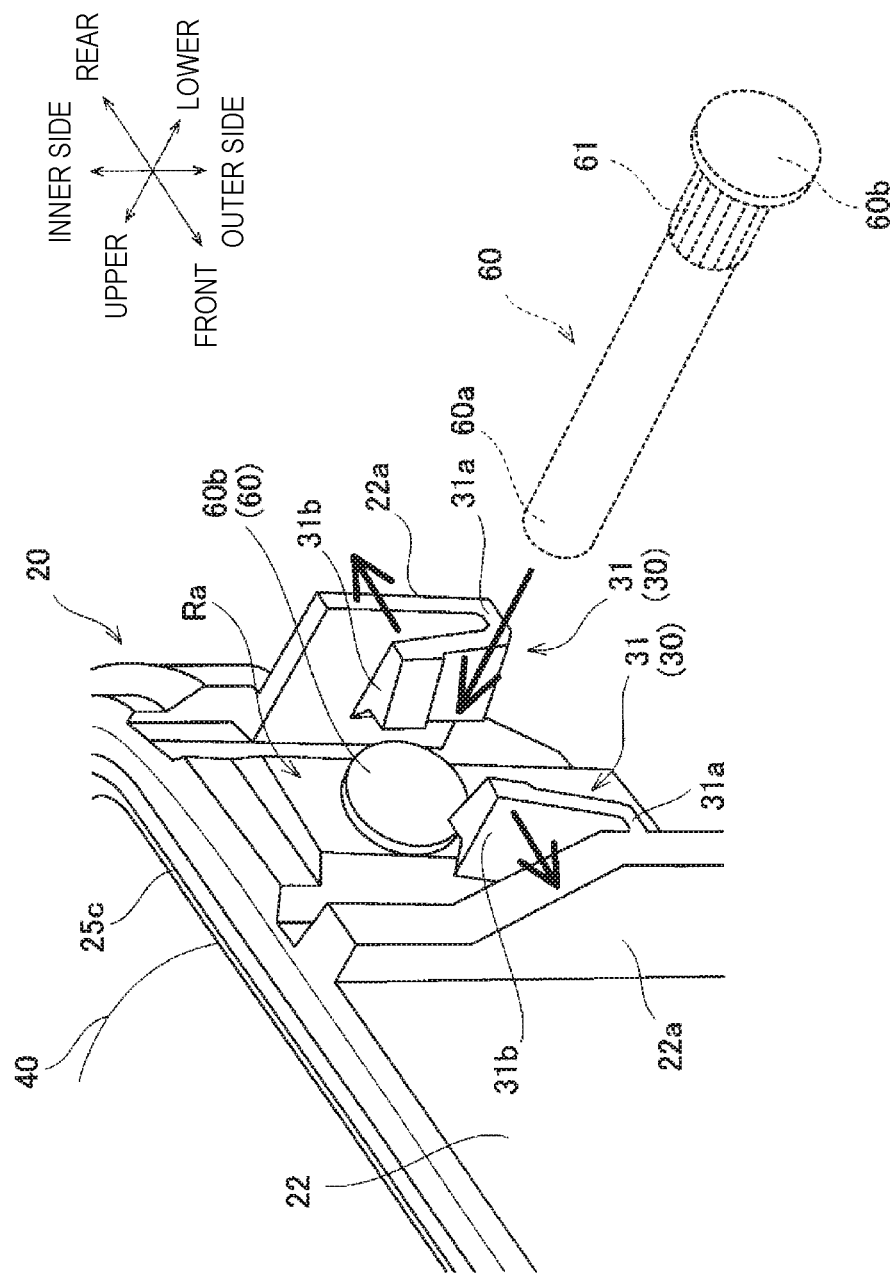
FIG. 7 is a perspective view showing a state of the pin inserted into the handle case.

Hereinafter, the slip-off prevention structure of the pin 60 provided in the handle case 20, which is one of the features of the present embodiment, will be described. Here, FIG. 4 is a perspective view of the handle case 20 centered on the slip-off prevention structure of the pin 60. FIG. 5 is a front view of the handle case 20 centered on the slip-off prevention structure of the pin 60, and FIG. 6 is a bottom view of the handle case 20 centered on the slip-off prevention structure of the pin 60. FIG. 7 is a perspective view showing a state of the pin 60 inserted into the handle case 20.

The handle case 20 includes ribs 30 which prevent the pin 60 from slipping off. The rib 30 is provided on the peripheral wall 22 of the handle case 20 so as to face the head portion 60b of the pin 60 inserted into the pin insertion hole 25c1. In the present embodiment, the ribs 30 are provided symmetrically on both sides of the pin 60.

Each rib 30 is formed of an elastic piece 31 elastically deformed in a vehicle front-rear direction, which is a direction orthogonal to an insertion direction (the upper-lower direction in the present embodiment) of the pin 60. Specifically, a base end portion 31a of the elastic piece 31 is connected to a holding plate 22a (a part of the peripheral wall portion 22) erected on the peripheral wall portion 22, and the elastic piece 31 extends from the base end portion 31a to the tip end portion 31b in a cantilever manner. The elastic piece 31 extends along an in-plane direction of a case region (hereinafter referred to as "peripheral region") Ra around the pin insertion hole 25c1. The elastic piece 31 extends in an oblique direction such that a tip end portion 31b side thereof approaches the pin insertion hole 25c1, and in a state in which the pin 60 is inserted into the handle case 20, the tip end portion 31b of the elastic piece 31 is set so as to be positioned above the head portion 60b of the pin 60.

The elastic piece 31 is formed of a plate-shaped body having a plate width in the insertion direction of the pin 60. Further, a surface of the tip end portion 31b of the elastic piece 31 facing the pin 60 is set in a tapered shape such that a plate thickness increases along the insertion direction of the pin 60. Therefore, a gap C between the pair of elastic pieces 31 facing each other gradually decreases along the insertion direction of the pin 60. A minimum width of the gap C is set to a value smaller than an outer diameter of the head portion 60b of the pin 60.

A distance between the elastic piece 31 and the peripheral region Ra of the peripheral wall portion 22 in the insertion direction of the pin 60 is set to such a value that the tip end portion 60a of the pin 60 does not fall off the through hole 25b2 of the partition wall portion 25b by receiving the pin 60 on the elastic piece 31 even if the pin 60 falls off the handle case 20.

The peripheral region Ra is formed in a raised shape stepped in a direction closer to the rib 30 than the periphery of the peripheral region Ra, and a sufficient plate thickness (thickness) for press-fitting the pin 60 is ensured. When the handle case 20 is molded using a mold in consideration of such a plate thickness, it is necessary to set the mold with respect to the peripheral region Ra. Due to this effect of the mold, a cutout portions A1 in which a part thereof is missing is formed in the tip end portion 31b of the elastic piece 31.

In the inside door handle device 10 having such a configuration, the handle case 20 and the handle 40 are assembled in the following procedure.

First, the handle holding portion 23 and the base end portion 40a of the handle 40 are aligned to house the handle 40 in the handle case 20. In a state in which the base end portion 40a is housed in the handle holding portion 23, a through hole of the base end portion 40a is coaxially arranged with the through hole 25b2 of the partition wall portion 25b and the pin insertion holes 25c1 of the lower wall 25c.

Next, the pin 60 is inserted into the inside of the handle case 20 from the outer side thereof through the pin insertion hole 25c1. The tip end portion 60a of the pin 60 at the head is inserted into the pin insertion hole 25c1, and the tip end portion 60a is inserted into the through hole 25b2 of the partition wall portion 25b via the through hole of the base end portion 40a. The pin 60 is inserted until the head portion 60b of the pin 60 abuts on the peripheral wall portion 22 (peripheral region Ra).

In an insertion step of the pin 60, when the knurled portion 61 of the pin 60 reaches the pin insertion hole 25c1, an insertion force to the head portion 60b of the pin 60 is increased, and the knurled portion 61 is press-fitted into the pin insertion hole 25c1. When the knurled portion 61 is press-fitted into the pin insertion hole 25c1, the knurled portion 61 is tightly fitted into the pin insertion hole 25c1.

Further, in the insertion step of the pin 60, when the pin 60 is inserted to a certain amount, the head portion 60b of the pin 60 reaches the gap C between the pair of elastic pieces 31 (ribs 30). According to the tapered shape of the tip end portion 31b of the elastic piece 31, the gap C between the pair of elastic pieces 31 gradually narrows along the insertion direction of the pin 60. Therefore, when the pin 60 is inserted, the gap C is smaller than a diameter of the head portion 60b of the pin 60, and the tip end portion 31b of the elastic piece 31 is pushed outward by the head portion 60b of the pin 60. Accordingly, an external force acts from the head portion 60b to the tip end portion 31b of the elastic piece 31, the elastic piece 31 is elastically deformed in a direction orthogonal to the insertion direction of the pin 60 (front-rear direction). This elastic deformation allows the pin 60 to be inserted into the pin insertion hole 25c1.

On the other hand, when the pin 60 is inserted and the head 60b thereof passes through the elastic pieces 31, the elastic pieces 31 elastically return to the original shape. Accordingly, the tip end portion 31b of the elastic piece 31 is positioned above the head portion 60b of the pin 60 so as to face the head portion 60b. Therefore, even when the pin 60 is pulled out of the pin insertion hole 25c1, the head portion 60b of the pin 60 is received by the ribs (elastic pieces 31). As a result, the pin 60 can be restricted from falling off the pin insertion hole 25c1.

In this way, the inside door handle device 10 according to the present embodiment includes the handle case 20 disposed on the door trim 2 which is a member on the vehicle body side, the cylindrical pin 60 supported by the handle case 20, and the handle 40 housed in the handle case 20 and pivotally supported by the pin 60 so as to be rotatable. In this case, the handle case 20 includes a pin insertion hole 25c1 into which the pin 60 can be inserted from the outer side of the handle case 20, and ribs 30 which are provided to face the head portion 60b of the pin 60 inserted into the pin insertion hole 25c1 and prevent the pin 60 from slipping off. Here, the rib 30 extends from the handle case 20 along the in-plane direction of the case region (peripheral region Ra) around the pin insertion hole 25c1, and is formed of the elastic piece 31 elastically deformed in the direction orthogonal to the insertion direction of the pin 60.

As shown in the present embodiment, in a case where the elastic piece 31, which is the rib 30, is disposed so as to face the head portion 60b of the pin 60, it is necessary to retract the elastic piece 31 from the path of the pin 60 when the pin 60 inserted. Therefore, the elastic piece 31 is required to due flexibility for deforming in the direction orthogonal to the insertion direction of the pin 60.

Figure 8:
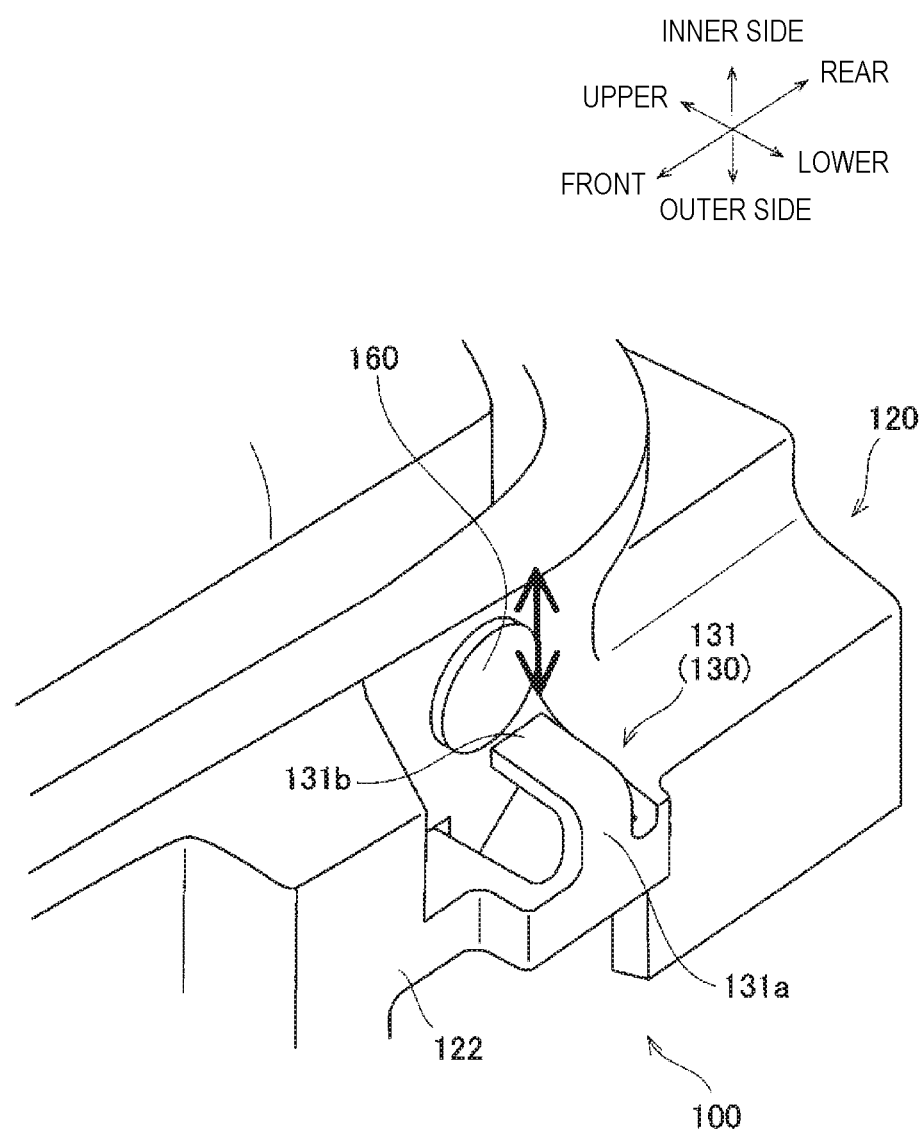
FIG. 8 is a perspective view showing a main part of an inside door handle device of a comparative example.

Here, FIG. 8 shocks an inside door handle device 100 of a comparative example. A rib 130 of the inside door handle device 100 according to the comparative example is formed of an elastic piece 131 elastically deformed in a direction orthogonal to an insertion direction of the pin 160. A base end portion 131a of the elastic piece 131 is connected to a handle case 120, and extends from a base end portion 131a to a tip end portion 131b in a cantilever manner. In this case, the elastic piece 131 extends along the insertion direction of the pin 160.

In this configuration, in order to provide the elastic piece 131 with sufficient flexibility, it is necessary to sufficiently ensure the length of the elastic piece 131 in the extending direction. That is, it is necessary to provide the elastic piece 131 so as to protrude outward from the peripheral wall portion 122 of the handle case 120. On the other hand, a space between the handle case 120 and a door trim on which the handle case 120 is disposed is small. Therefore, there is a problem that a structure of the rib 130 (elastic piece 131) interferes with the door trim, and the inside door handle device 100 cannot be assembled to the door trim.

According to the inside door handle device 10 according to the present embodiment, the elastic piece 31 extends from the base end portion 31a to the tip end portion 31b along the in-plane direction of the peripheral region Ra. Therefore, even if the length enough to provide sufficient flexibility is ensured in the extending direction of the elastic piece 31, the elastic piece 31 does not largely protrude to the outside of the peripheral wall portion 22. As a result, the rib 30 can be housed in a small space S (see FIG. 2) between the handle case 20 and the door trim 2, and the inside door handle device 10 can be assembled without interfering with the door trim 2. Accordingly, it is possible to provide the inside door handle device 10 which is excellent in assemblability while providing the slip-off prevention structure of the pin 60 which pivotally supports the handle 40.

Figure 9:
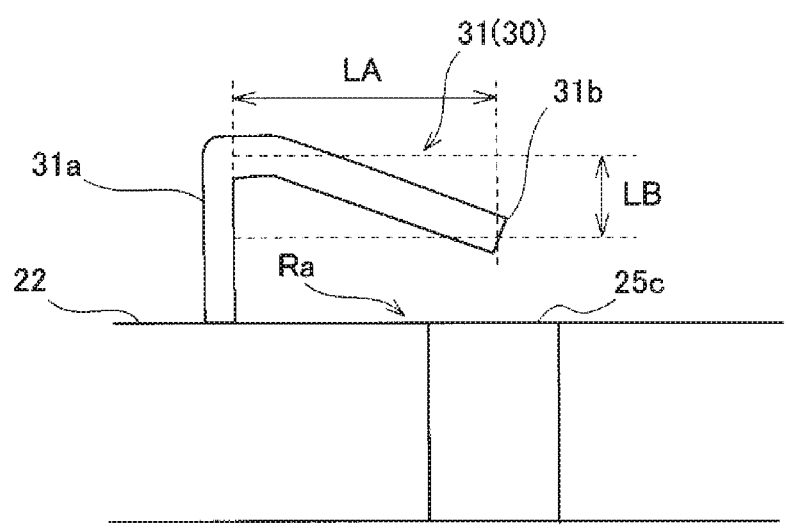
FIG. 9 is an explanatory view showing a concept of an elastic piece.

In the present embodiment, the state in which the elastic piece 31 extends in the in-plane direction is a concept including not only a state in which the elastic piece 31 extends parallel to the in-plane direction of the peripheral region Ra but also a state in which the elastic piece 31 extends while being inclined to the in-plane direction of the peripheral region Ra. Here, as shown in FIG. 9, the elastic piece 31 extends while being inclined to the in-plane direction of the peripheral region Ra, the extending state of the elastic piece 31 can be divided into an extending component LA in the in-plane direction in the peripheral region Ra and an extending component LB in a direction orthogonal to a surface in the peripheral region Ra. In order for the elastic piece 31 to have flexibility, the elastic piece 31 needs to extend sufficiently long, but as a method of extending the elastic piece 31, there are a method of ensuring the large extending component LB in the direction orthogonal to the surface and a method of ensuing the large extending component LA in the in-plane direction.

In a case where the extending component LB in the direction orthogonal to the surface is large, the elastic piece 31 largely protrudes to the outside of the peripheral wall portion 22. On the other hand, if the extending component LA in the in-plane direction is set to be large, possible to extend the elastic piece 31 while suppressing the protrusion to the outside of the peripheral wall portion 22 to ensure flexibility. Therefore, it is preferable that the elastic piece 31 is set in such a relationship that the extending component LA in the in-plane direction in the peripheral region Ra is equal to or larger than the extending component LB in the direction orthogonal to the surface in the peripheral region Ra. Accordingly, it is possible to satisfy two requirements of making the outside of the peripheral wall portion 22 compact while sufficiently ensuring the length in the extending direction of the elastic piece 31 and obtaining flexibility.

Also, in the present embodiment, the elastic piece 31 is elastically deformed in a direction orthogonal to the insertion direction of the pin 60 to allow the pin 60 to be inserted into the pin insertion hole 25c1. Further, the head portion 60b of the pin 60 passes through the elastic pieces 31 and the elastic pieces 31 elastically return, and thereby the elastic pieces 31 are positioned above the head portion 60b of the pin 60 to restrict the pin 60 from falling off.

According to this configuration, it is possible to easily insert the pin 60 and prevent the pin 60 from slipping off while making the outside of the peripheral wall portion 22 have a compact configuration.

Further, in the present embodiment, the elastic piece 31 is formed of a plate-shaped body having a plate width set in the insertion direction of the pin 60, and a surface of the tip end portion 31b of the elastic piece 31 facing the pin 60 is set in a tapered shape such that a plate thickness increases along the insertion direction of the pin 60.

According to this configuration, the elastic piece 31 has high flexibility to the direction orthogonal to the insertion direction of the pin 60, and has high rigidity to the slip-off direction (downward direction) of the pin 60. Accordingly, the elastic piece 31 exhibits high rigidity, and it is possible to appropriately prevent the pin 60 from slipping off.

Further, by forming the surface of the tip end portion 31b facing the pin 60 into the tapered shape, the pin 60 can be appropriately elastically deformed when being inserted. Accordingly, the pin 60 can be smoothly inserted.

Further, in the present embodiment, the handle case 20 includes a vertical wall portion 21 facing the door inner panel 1, and a peripheral wall portion 22 continuously connected to the peripheral edge of the vertical wall portion 21 and surrounded by the door trim 2. In this case, the pin insertion hole 25c1 is provided in the peripheral wall portion 22 of the handle case 20, and the base end portion 31a of the elastic piece 31 is connected to the peripheral wall portion 22.

The periphery of the peripheral wall portion 22 of the handle case 20 is surrounded by the door trim 2, and a small space (see FIG. 2) is formed therebetween. According to the inside door handle device 10 according to the present embodiment, the rib 30 has a structure in which the rib 30 does not easily protrude outward of the peripheral wall portion 22. Therefore, the rib 30 can be prevented from interfering with the door trim 2, and assemblability of the inside door handle device 10 can be improved.

In the present embodiment, the ribs 30 are provided symmetrically on both sides of the pin 60.

According to this configuration, it is possible to ensure a constant holding force to the pin 60 by setting the pair of ribs 30, as compared with a case of setting a single rib 30. Accordingly, the slip-off of the pin 60 can be reliably prevented.

Although the handle device according to the present embodiment has been described above, the present invention is not limited to the embodiment described above, and various modifications can be made within the scope of the present invention. In the embodiment described above, the inside door handle device applied to a side door has been described as the handle device, but the inside door handle device may be applied to a back door and to various handle devices.

In the present embodiment, a direction in which the elastic piece is elastically deformed is set as the front-rear direction, but any direction may be set as the front-rear direction as long as the direction is orthogonal to the insertion direction of the pin. For example, the direction may be set in a left-right direction of the vehicle (interior-exterior direction of vehicle cabin) or other directions as long as the handle case is manufactured by a method other than molding and a pull-out direction of a mold is not taken into consideration.

Further, in the present embodiment, the structure in which the handle is pivotally supported by the pin has been described, but the pin may pivotally support the lock knob, or may pivotally support both the lock knob and the handle. That is, the operation member may be a lock knob other than the handle.

Further, the slip-off prevention structure may be formed of a single rib instead of being formed of the pair of ribs.

The present application is based on a Japanese Patent Application (JP-A-2016-238197) filed on Dec. 8, 2016, contents of which are incorporated herein as reference.

REFERENCE SIGNS LIST 1 door inner panel
2 door trim
2a opening peripheral edge portion
3 opening portion
10 inside door handle device
20 handle case
21 vertical wall portion
22 peripheral wall portion
23 handle holding portion
24 lock knob holding portion
25a upper wall portion
25a1 convex portion
25b partition wall portion
25b1 convex portion
25b2 through hole
25c lower wall portion
25c1 pin insertion hole
30 rib
31 elastic piece
31a base end portion
31b tip end portion
40 handle
40a base end portion
40b operation portion
50 lock knob
60 pin
60a tip end portion
60b head portion
61 knurled portion
65 torsion spring
A1 cutout portion
C gap
Ra peripheral region

The invention claimed is:

1. A handle device comprising:
a handle case which is disposed on a member on a vehicle body side;
a cylindrical pin which is supported by the handle case; and
an operation member which is housed in the handle case and is pivotally supported by the pin so as to be rotatable,
wherein the handle case includes: a vertical wall portion to face a vehicle body panel; a peripheral wall portion connected to a peripheral edge of the vertical wall portion and extending in a direction substantially perpendicular to a plane in which the vertical wall portion extends and towards the vehicle body panel; a pin insertion hole in the peripheral wall portion into which the pin is configured to be inserted from an outer side of the peripheral wall portion; and a rib which is provided to face a head portion of the pin inserted into the pin insertion hole and prevents the pin from slipping off,
wherein the rib extends from the outer side of the peripheral wall portion and is substantially parallel to a case region of the peripheral wall portion around the pin insertion hole, and includes an elastic piece which is configured to be elastically deformed in a direction orthogonal to an insertion direction of the pin, and
wherein the rib is configured to, when the pin is inserted into the pin insertion hole, face the head portion of the pin.

2. The handle device according to claim 1,
wherein the head portion of the pin is configured to pass through the elastic piece, the elastic piece is configured to elastically return, and the elastic piece is configured to be positioned above the head portion of the pin to restrict the pin from falling off.

3. The handle device according to claim 1,
wherein the elastic piece includes a plate-shaped body having a plate width set in the insertion direction of the pin, and
wherein a surface of a tip end of the elastic piece facing the pin has a tapered shape such that a plate thickness increases along the insertion direction of the pin.

4. The handle device according to claim 1,
wherein the peripheral wall portion is surrounded by an interior trim mounted on a vehicle cabin interior side of the vehicle body panel, and
wherein a base end portion of the elastic piece is directly connected to the peripheral wall portion.

5. The handle device according to claim 1, wherein the ribs are provided symmetrically on both sides of the pin.

6. The handle device according to claim 1,
wherein the pin is provided with a flange shaped head portion at one end of the pin in a longitudinal direction and a knurled portion formed in a certain region towards the head portion in the longitudinal direction wherein the head portion is enlarged radially outward to prevent the pin from being buried in the handle case when being inserted into the insertion hole and the knurled portion has an outer diameter being larger than an inner diameter of the pin insertion hole so that the knurled portion is press-fitted into the pin insertion hole.

7. The handle device according to claim 1,
wherein the elastic piece has a base end portion which is connected to a holding plate erected on the peripheral wall portion and extending in a pin insertion direction and the elastic piece has a tip end portion extending from the base end portion in a cantilever manner, wherein the tip end portion is configured to be elastically deformed in the direction orthogonal to the insertion direction of the pin, and wherein the head portion of the pin is configured to pass through the elastic piece, the elastic piece is configured to elastically return, and the tip end portion of the elastic piece is configured to be positioned above the head portion of the pin to restrict the pin from falling off.

8. The handle device according to claim 1, wherein the peripheral wall portion extends over an entirety of the peripheral edge of the vertical wall portion and protrudes from the entirety of the peripheral edge of the vertical wall portion in the direction perpendicular to the plane in which the vertical wall portion extends.

* * * * *